May 27, 1924.
G. VINCON
1,495,564
THRUST AND RADIAL BEARING
Filed May 31, 1922
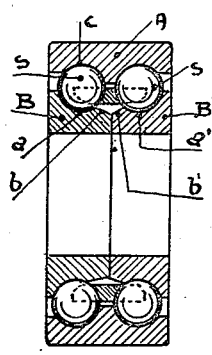
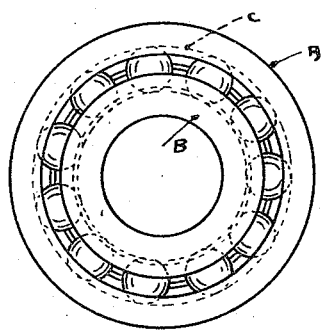
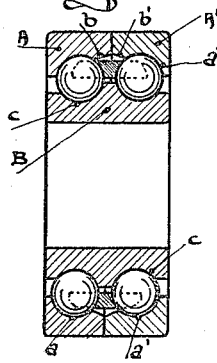
Inventor.
Gustavo Vinçon,
By Henry Orth
Atty.

Patented May 27, 1924.

1,495,564

UNITED STATES PATENT OFFICE.

GUSTAVO VINÇON, OF VILLAR PEROSA, NEAR PINEROLO, ITALY.

THRUST AND RADIAL BEARING.

Application filed May 31, 1922. Serial No. 564,900.

*To all whom it may concern:*

Be it known that I, GUSTAVO VINÇON, a subject of the King of Italy, residing at Villar Perosa, near Pinerolo, in the Kingdom of Italy, have invented certain new and useful Improvements in Thrust and Radial Bearings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a thrust and radial bearing having a double series of balls and no openings for placing said balls in the raceway, the outer or inner race of the bearing being composed of two parts held together without the use of any special connecting means.

According to this invention an integral ring has on its middle portion a shoulder embracing through an arc of about 90°, the two rows of balls, while each section of the other ring has an outer shoulder or rib which also embraces, through about 90°, the adjacent row of balls. Each section also has a very short inner rib and the inner edges of the sections are flared so as to form an enlarged annular space between the outer edges of the integral ring and the sections in order to facilitate the assemblage of the bearing.

The balls are first introduced into the race made of one solid piece, and the two parts of the other race are then forced in place one against the other by causing the balls to slip over the lower shoulder along the conical surface, this being allowed by the elasticity of material and by occasionally heating the outer race. It is clear that once both parts of the race are assembled, the same are tightly held in place, the balls preventing them from becoming disconnected by acting upon the shoulder of each race portion, which then work as locking devices.

The accompanying drawing shows, by way of example, a constructional form of a ball bearing in accordance with my invention.

Fig. 1 is an axial section, and

Fig. 2 is a side view of the bearing having the inner race made of two parts;

Fig. 3 is an axial section of a modified form of my invention.

Referring to Figs. 1 and 2:

A shows the outer race having a circular rolling path $c$ for each series of balls S as shown in the drawing (Fig. 1); B and B' show the two component parts of the inner race.

The pieces B and B' are provided with circular rolling paths $a$ and $a'$ asymmetric to the plane passing through the series of balls S, showing a very small shoulder towards the adjacent series of balls, (the height of shoulder is exaggerated on the drawing, it can practically be reduced to a few hundredths of a millimeter) sloping inwards, thus forming a conical surface $b$, $b'$, for introducing the race portions B, B' into the outer race, wherein the balls with their respective cage have been previously disposed.

The elasticity of the material of the raceway members permits the parts B, B', with the balls therein, to be introduced into the integral member A by exerting an axial pressure on said parts. The assemblage may be facilitated by heating the member A when the parts B, B' are introduced into said member, as in Fig. 1. It is clear that the shoulder (even if reduced to a few hundredths of a millimeter) is sufficient for holding the bearing assembled owing to its action against the balls.

Fig. 3 shows an arrangement similar to the above described, the only difference being that the outer race is made of two parts A and A' while the inner race B is made of one solid piece.

What I claim is:

1. A ball bearing comprising an integral annular member having parallel race-ways therein, a plurality of annular sections concentric with the integral member each having a race way therein, balls in the race ways, said integral member having a central annular rib embracing the balls in each race way through an arc of substantially 90 degrees, the annular sections having ribs on their outer edges embracing the adjacent balls through an arc of substantially 90 degrees, and having shorter ribs adjacent their inner edges embracing the adjacent balls.

2. A ball bearing comprising an integral annular member having parallel race ways therein, a plurality of annular sections concentric with the integral member each having a race way therein, balls in the race ways, said integral member having a central annular rib embracing the balls in each race way through an arc of substantially 90 degrees, the annular sections having ribs on their outer edges embracing the adjacent balls through an arc of substantially 90 degrees and having shorter ribs adjacent their inner edges embracing the adjacent balls, the inner edges of the annular sections being beveled, whereby an enlarged annular space is formed between the integral member and inner edges of the annular sections to facilitate the assembling of the bearing.

In testimony that I claim the foregoing as my invention, I have signed my name.

GUSTAVO VINÇON.